United States Patent
Kim et al.

(10) Patent No.: US 7,013,031 B2
(45) Date of Patent: Mar. 14, 2006

(54) FINGERPRINT SENSOR USING A PIEZOELECTRIC MEMBRANE

(75) Inventors: Chang-jung Kim, Seoul (KR); Young-soo Park, Suwon (KR); June-key Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 626 days.

(21) Appl. No.: 10/139,251

(22) Filed: May 7, 2002

(65) Prior Publication Data

US 2002/0191820 A1   Dec. 19, 2002

(30) Foreign Application Priority Data

May 12, 2001 (KR) ............................... 2001-25983

(51) Int. Cl.
  *G06K 9/00* (2006.01)
(52) U.S. Cl. .................. 382/124; 257/419; 310/318
(58) Field of Classification Search ............ 382/124, 382/116, 117; 324/66, 687, 661, 662, 663, 324/671, 686, 681; 283/68; 257/108, 418, 257/419, 415; 341/33; 340/5.83, 5.53; 438/53, 438/14; 250/227.11, 227.2; 73/862.474; 310/318, 800, 320; 356/71
See application file for complete search history.

(56) References Cited

U.S. PATENT DOCUMENTS

| | | | | |
|---|---|---|---|---|
| 4,394,773 A | * | 7/1983 | Ruell | 382/124 |
| 4,429,413 A | * | 1/1984 | Edwards | 382/124 |
| 5,844,287 A | * | 12/1998 | Hassan et al. | 257/419 |
| 5,877,580 A | * | 3/1999 | Swierkowski | 310/328 |
| 6,234,031 B1 | * | 5/2001 | Suga | 73/862.474 |
| 6,437,583 B1 | * | 8/2002 | Tartagni et al. | 324/687 |
| 6,522,773 B1 | * | 2/2003 | Houdeau | 382/124 |

* cited by examiner

*Primary Examiner*—Sheela Chawan
(74) *Attorney, Agent, or Firm*—Lee & Morse, P.C.

(57) ABSTRACT

A fingerprint sensor for sensing a fingerprint by converting pressure applied to a piezoelectric membrane into an electrical signal is provided, wherein the fingerprint sensor having an aggregate of piezoelectric devices includes: a substrate; a lower electrode formed on the substrate; a piezoelectric membrane formed on the lower electrode; an upper electrode formed on the piezoelectric membrane; a pressuring portion formed on the upper electrode for changing a quantity of charge on the piezoelectric membrane due to pressure exerted by contact of a fingerprint; and a non-conductive layer formed on the lower electrode for supporting and exposing the pressuring portion. Thus, a fingerprint sensor having a simple structure is provided, which is able to precisely sense fingerprint information utilizing a piezoelectric phenomenon. The fingerprint sensor may be applied to systems for identifying persons' identities in public institutions and private enterprises, and in individuals' portable systems.

14 Claims, 4 Drawing Sheets

FINGERPRINT SENSOR USING A PIEZOELECTRIC MEMBRANE

BACKGROUND OF THE INVENTION

1. Field of the Invention

The present invention relates to a fingerprint sensor using a piezoelectric membrane. More particularly, the present invention relates to a fingerprint sensor for sensing a fingerprint by converting pressure applied to a piezoelectric membrane into an electrical signal.

2. Description of the Related Art

Socioeconomic developments have led to off-line direct transactions and cash transactions in the purchase of and payment for goods. To facilitate such transactions, a new form of payment, i.e., using credit cards or on-line e-money, has emerged. As a result, security of one's private information has become a critical issue, and an individual fingerprint sensor is needed to protect an individual's information. In addition, a technique for sensing and deciphering a fingerprint in-situ, where private information is needed, is required.

FIG. 1 shows a perspective view of a conventional fingerprint sensor. Referring to FIG. 1, if a piezoelectric thick film 11 is pressed by a finger, a current density on a contact portion 9 between a fingerprint 12 and the piezoelectric thick film 11 is changed by pressure 13 due to the fingerprint 12.

The current density is read to an output line 15 through sensing devices 14 to sense the fingerprint 12. However, since information is read using a thick film and not a membrane, it is difficult to precisely measure information and to manufacture the fingerprint sensor as a one-chip type. Accordingly, there is a problem in that it is difficult for an individual to carry the fingerprint sensor, and therefore simple applications to portable systems are difficult.

FIG. 2 shows a cross-sectional view explaining the operation of a conventional fingerprint sensor. This type of conventional fingerprint sensor uses the principle of a capacitive CMOS sensor. Capacitance between sensor surfaces 22 on a substrate 21 and a fingerprint 23 is measured, converted into an electrical signal, and realized as a digital image.

However, this way is very sensitive to temperature and moisture. Additionally, there are problems in that additional circuitry and materials are necessary because of static electricity and it is difficult to draw regular results. Moreover, the quantity of charge readable from the fingerprint and sensor surfaces when operating the fingerprint sensor is small and thus must be separately stored by repeatedly toggling a switch on and off.

SUMMARY OF THE INVENTION

In an effort to solve the problems described above, it is a feature of an embodiment of the present invention to provide a fingerprint sensor in which: the fingerprint sensor has a membrane shape in which unit devices are arrayed, wherein the unit devices exploit a piezoelectric phenomenon to precisely sense information from a fingerprint, i.e., pressure from protrusions of the fingerprint and grooves between the protrusions of the fingerprint; capacitance measured based on changes in temperature and humidity are regular; and reliable results are obtained in-situ.

Accordingly, there is provided a fingerprint sensor having an aggregate of piezoelectric devices. The fingerprint sensor includes: a substrate; a lower electrode formed on the substrate; a piezoelectric membrane formed on the lower electrode; an upper electrode formed on the piezoelectric membrane; a pressuring portion formed on the upper electrode for changing a quantity of charge on the piezoelectric membrane due to pressure exerted by contact of a fingerprint; and a non-conductive layer formed on the lower electrode for supporting and exposing the pressuring portion.

Preferably, the aggregate of piezoelectric devices further includes a capacitor, formed on the lower electrode, for storing changes in the quantity of charge occurring on the piezoelectric membrane.

The pressuring portion preferably protrudes from the surface of the non-conductive layer and the width of the pressuring portion is preferably smaller than each protrusion of the fingerprint and a distance between the protrusions.

It is preferable that the width of the pressuring portion is 50 $\mu$m or less.

It is also preferable that the aggregate of piezoelectric devices has a structure in which piezoelectric devices are arrayed at regular intervals.

The fingerprint sensor may further include a supporting layer formed between the substrate and the lower electrode, wherein the supporting layer preferably includes $Si_3N_4$ or $SiO_2$.

Preferably, a cavity is formed in the substrate, and the piezoelectric membrane, the upper electrode, and the pressuring portion are formed on the lower electrode opposite the cavity.

The piezoelectric membrane preferably includes PST, Quartz, $BaTiO_3$, PZT, (Pb, Sm)$TiO_3$, PMN(Pb(MgNb)$O_3$)-PT(PbTiO$_3$), PVDF-TrFE, or PVDF.

The fingerprint sensor may further include an electrical circuit for outputting changes in the quantity of charge occurring on the piezoelectric membrane.

BRIEF DESCRIPTION OF THE DRAWINGS

These and other features and advantages of the present invention will become more apparent to those of ordinary skill in the art by describing in detail preferred embodiments thereof with reference to the attached drawings in which.

DETAILED DESCRIPTION OF THE INVENTION

Korean Patent Application No. 2001-25983, filed on May 12, 2001, and entitled: "Fingerprint Sensor Using Piezoelectric Membrane," is incorporated by reference herein in its entirety.

Figure 3:
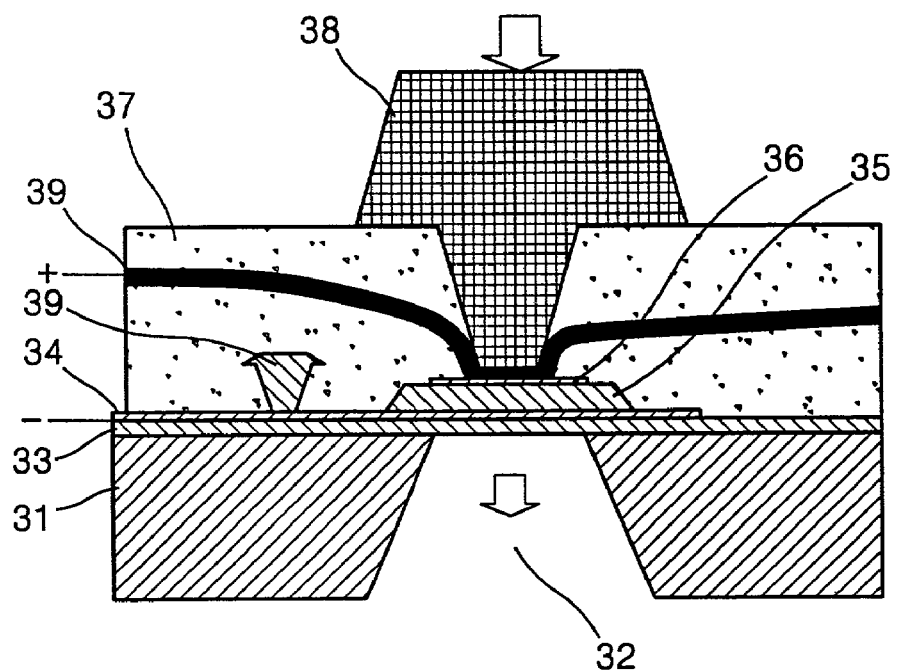
FIG. 3 shows a cross-sectional view of the structure of unit cells of a fingerprint sensor according to a first embodiment of the present invention.

The structure of a unit piezoelectric device of a fingerprint sensor according to a first embodiment of the present invention will be described with reference to FIG. 3.

A supporting layer 33 is formed on a substrate 31 in which a cavity 32 is formed. A lower electrode 34 is formed on the supporting layer 33. A piezoelectric membrane 35 is formed on a portion of the lower electrode 34 opposite the cavity 32. An upper electrode 36 is formed on the piezoelectric membrane 35. A pressuring portion 38 for applying pressure exerted by contact of a fingerprint of a finger is formed on the upper electrode 36. A non-conductive layer 37 is formed between the pressuring portion 38 and the lower electrode 34. A wiring 39 for transmitting current of the lower and upper electrodes 34 and 36 to the outside is formed in the non-conductive layer 37.

The supporting layer 33 is not necessary, but maintains elasticity against pressure from the pressuring portion 38 and supports the unit piezoelectric device to maintain the structural safety thereof. If present, it is preferable that the supporting layer 33 is formed of $Si_3N_4$ or $SiO_2$. The lower and upper electrodes 34 and 36 serve to transmit changes in current occurring on the piezoelectric membrane 35 due to the pressure from the pressuring portion 38 to the outside through the wiring 39 in the non-conductive layer 37. The lower and upper electrodes 34 and 36 are formed of a material of which general electrodes are formed.

The pressuring portion 38 serves to transmit pressure applied by contact of protrusions of a fingerprint to the piezoelectric membrane 35. The pressuring portion 38 protrudes from the surface of the non-conductive layer 37. The width of the pressuring portion 38 that the fingerprint contacts must be smaller than the protrusions of the fingerprint and the distance between the protrusions. Thus, the size of the pressuring portion 38 is preferably smaller than 50 μm.

The piezoelectric membrane 35 may be formed of a general piezoelectric material including oxide and polymer. The piezoelectric material preferably includes any of PST, Quartz, $BaTiO_3$, PZT, (Pb, Sm)$TiO_3$, PMN(Pb(MgNb)$O_3$)-PT(PbTiO$_3$), PVDF-TrFE, and PVDF. These piezoelectric materials are preferable because an electric field changing with respect to an applied pressure is large for these materials. This is represented by formula (1):

$$E1 = gX$$
$$x = dE2 \quad (1)$$

where E1, g, and X represent an induced electric field, a piezoelectric voltage constant, and an external pressure, respectively, and E2, x, and d represent an external electric field, an induced stress, and a piezoelectric stress constant, respectively.

The piezoelectric voltage constant g and the piezoelectric stress constant d are inherent numerical values based on each of the piezoelectric materials. From formula (1), it may be seen that in the fingerprint sensor of the present invention, a better effect may be obtained as g is increased and d is decreased. Values of the piezoelectric voltage constant g and the piezoelectric stress constant d of each piezoelectric material are set forth in table 1 below.

TABLE 1

| Material | $BaTiO_3$ | PZT | PST | (Pb, Sm)$TiO_3$ | PVDF-TrFE |
|---|---|---|---|---|---|
| g ($10^{-3}$Vm/n) | 12.6 | 26.1 | 19.7 | 42 | 380 |
| d (pC/N) | 190 | 289 | 593 | 65 | 33 |

Any material shown in table 1 may serve as the piezoelectric membrane 35 of the fingerprint sensor of the present invention. It is preferable, however, that the piezoelectric membrane 35 is formed of PVDF-TrFE or (Pb, Sm)$TiO_3$.

A fingerprint sensor according to a second embodiment of the present invention will now be described with reference to FIG. 4.

Figure 4:
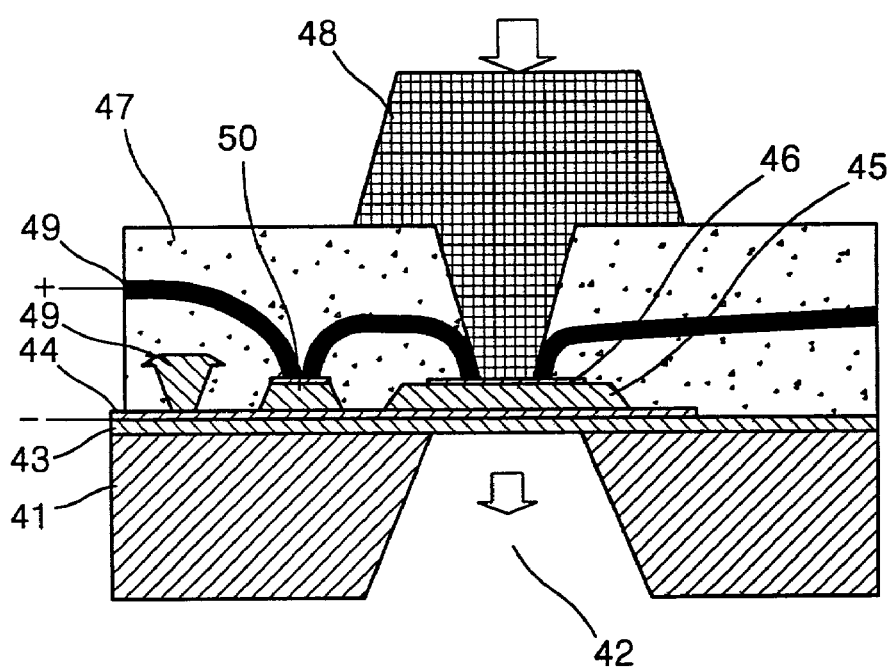
FIG. 4 shows a cross-sectional view of a fingerprint sensor according to a second embodiment of the present invention.

As shown in FIG. 4, a supporting layer 43 is formed on a substrate 41 in which a cavity 42 is formed. A lower electrode 44 is formed on a predetermined portion of the supporting layer 43.

A piezoelectric membrane 45 is formed on a portion of the lower electrode 44 opposite the cavity 42. An upper electrode 46 is formed on the piezoelectric membrane 45. A pressuring portion 48 for applying pressure exerted by contact of a fingerprint of a finger is formed on the upper electrode 46. A non-conductive layer 47 is formed between the pressuring portion 48 and the lower electrode 44 and the supporting layer 43. A wiring 49 for transmitting current of the lower and upper electrodes 44 and 46 to the outside is formed in the non-conductive layer 47. Thus, the structure described in the second embodiment is highly similar to the structure described in the first embodiment.

In the second embodiment, however, a capacitor 50 is formed on the lower electrode 44 having the pressuring portion 48 over the cavity 42 and is spaced apart from the piezoelectric membrane 45. The capacitor 50 is connected to the piezoelectric membrane 45 by the upper electrode 46.

Hereinafter, the operation of a fingerprint sensor according to the present invention will be described with reference to FIGS. 5A and 5B.

Figure 5A:
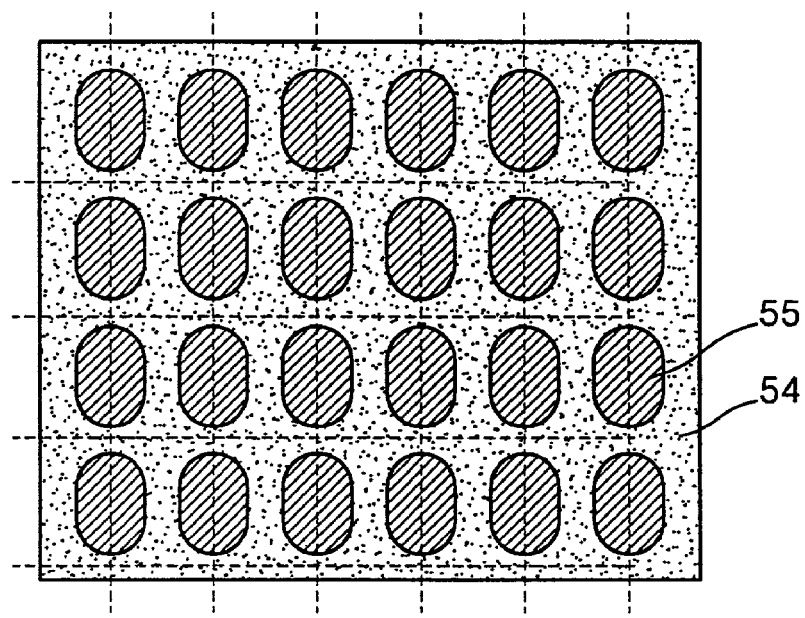
FIG. 5A shows a plan view of the array structure of a fingerprint sensor according to the present invention.
Figure 5B:
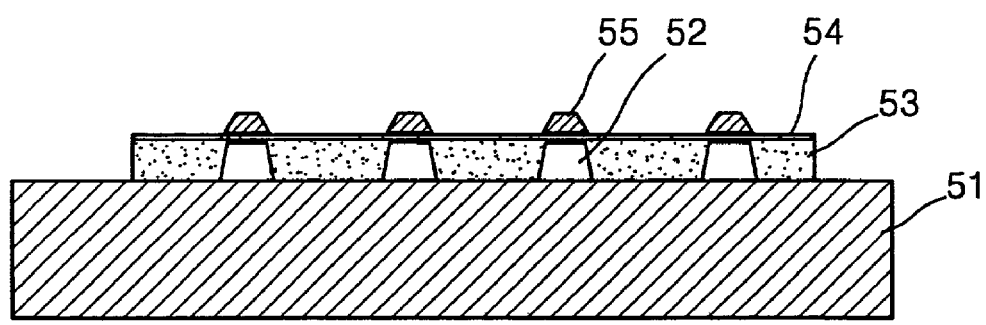
FIG. 5B shows a cross-sectional view of the array structure of a fingerprint sensor according to the present invention.

FIGS. 5A and 5B illustrate a plan view and a cross-sectional view, respectively, of a fingerprint sensor that is arrayed on an IC card 51. Referring to FIGS. 5A and 5B, fingers contact pressuring portions 55 of the fingerprint sensor. Thus, protrusions of fingerprints of the fingers transmit pressures to a piezoelectric membrane through the pressuring portions 55 and an upper electrode 54. The upper electrode 54, the piezoelectric membrane, and a lower electrode formed over cavities 52 in a substrate 53 are slightly curved due to the pressures. As shown in formula (1), an induced electric field occurs on the piezoelectric membrane. The amount of charge is changed due to the deformation of the piezoelectric membrane and changes in pyroelectric characteristics.

The induced electric field serves as an information signal on a fingerprint and determines the whole shape of the fingerprint using information of each unit cell. In FIG. 3, the lower and upper electrodes 34 and 36 directly transmit the induced electric field occurring on the piezoelectric membrane to the outside. However, in FIG. 4, the induced electric field is stored in the capacitor 50 of a unit device and is transmitted to the outside if the induced electric field is regular to sense the fingerprint.

Figure 6:
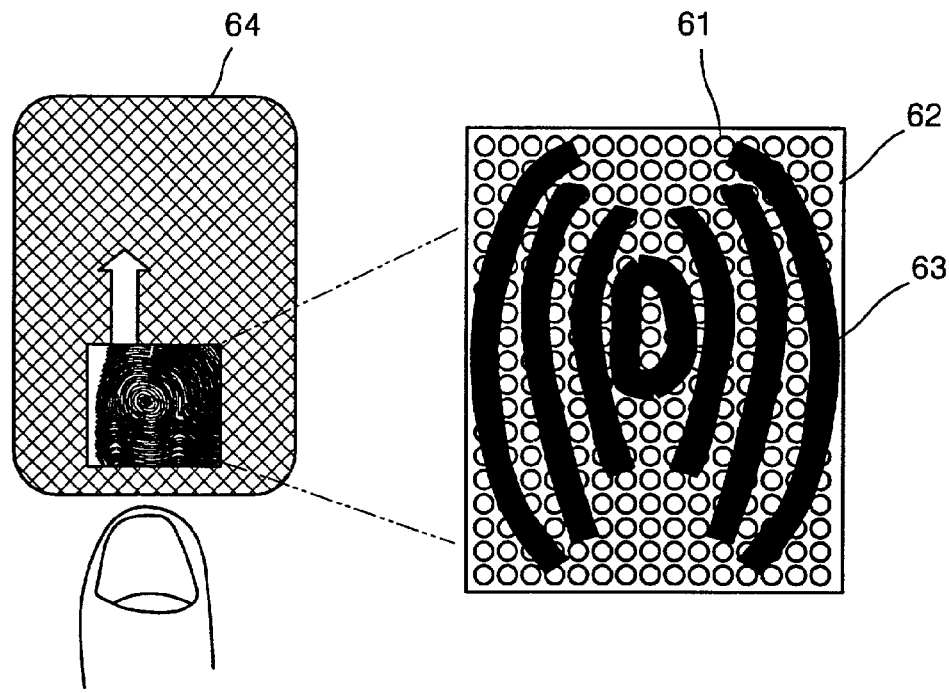
FIG. 6 shows a drawing of a portion of a unit, to which pressure is applied according to the shape of a fingerprint by pressing a pressuring portion of a fingerprint sensor with a finger.

FIG. 6 shows a drawing of a portion of a unit 62 to which pressure is applied in the shape of a fingerprint 63 by exerting pressure on pressuring portions 61 of a fingerprint sensor according to the present invention. The fingerprint sensor is applied to an IC card 64.

Figure 7:
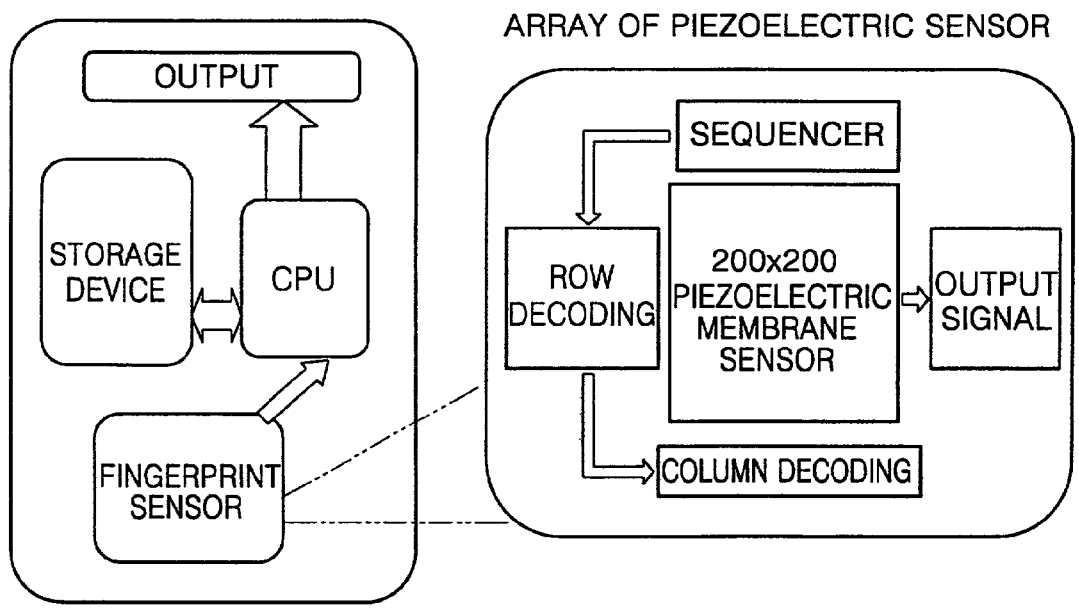
FIG. 7 shows a flowchart of steps for processing fingerprint information using a fingerprint sensor according to the present invention.

FIG. 7 shows a flowchart of steps for processing fingerprint information using a fingerprint sensor according to an embodiment of the present invention. For example, if a finger contacts a fingerprint sensor composed of a 200×200 array of unit cells reset by a sequencer, an induced electric field occurs on piezoelectric membranes of the unit cells that contact protrusions of a fingerprint due to pressure from the contact of the finger.

Each of the unit cells has an address designated by row decoding and column decoding. Information on whether or not induced current of each of the unit cells occurs is transmitted to an information-processing device, e.g., a CPU, and used to determine the shape of a fingerprint.

If current fingerprint information is to be used to determine one's identity, current fingerprint information may be compared with fingerprint information of a specified person stored in a storage device to determine whether the current fingerprint information corresponds to that of the specified person. The compared result is output. A fingerprint sensing card, to which the fingerprint sensor is applied, has a short-circuit for rapidly removing a signal output when pressuring portions of the fingerprint sensor are mistakenly pressed and converting the pressuring portions into an initial state for re-sensing a fingerprint.

Figure 1:
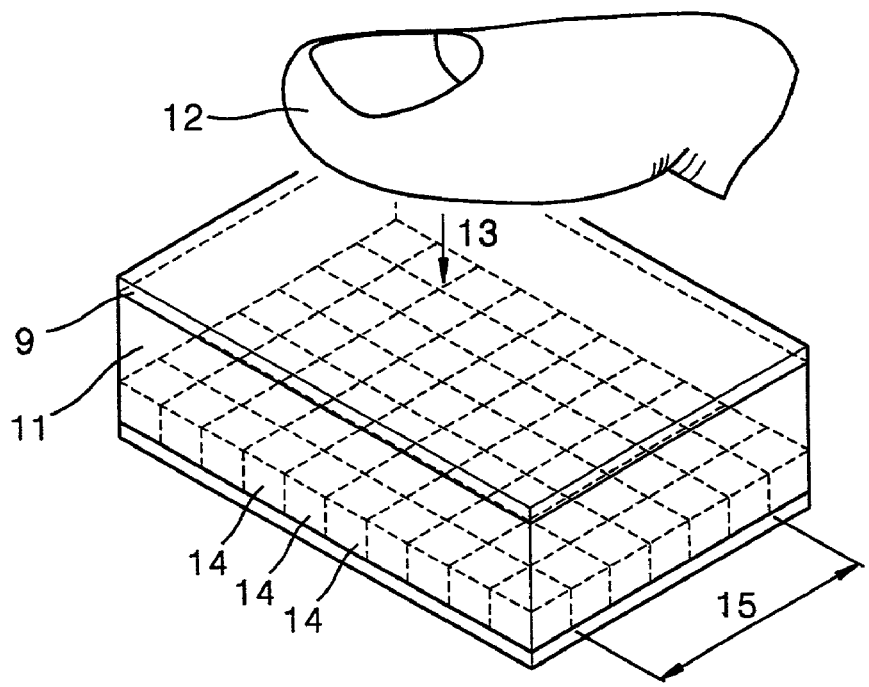
FIG. 1 shows a perspective view of a conventional fingerprint sensor.
Figure 2:
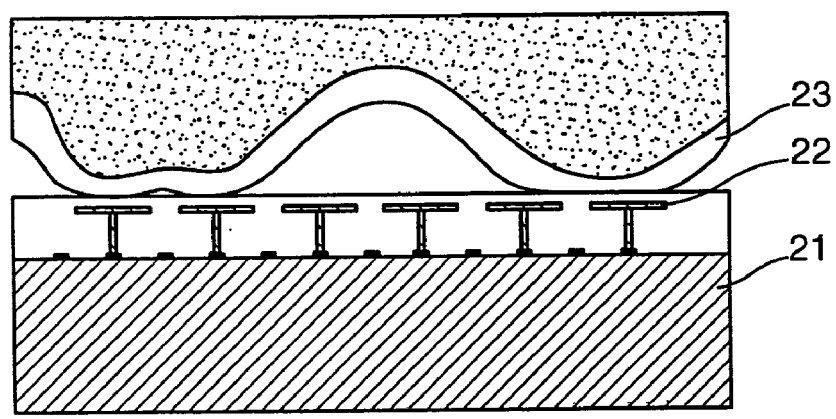
FIG. 2 shows a cross-sectional view explaining the operation of a conventional fingerprint sensor.

A fingerprint sensor according to the present invention has a simple structure in which a fingerprint is rapidly and precisely sensed. In a conventional fingerprint sensor shown in FIG. 2, charge quantity occurring from a fingerprint and a sensor surface is small. Thus, charge is accumulated in an additional capacitor. When the amount of charge accumulated surpasses a predetermined quantity, the charge is output as an information signal for sensing the fingerprint.

However, in the fingerprint sensor according to the present invention, charge occurring from the fingerprint sensor due to contact of a fingerprint is sufficient for sensing the fingerprint. Thus, an additional process of accumulating charge is unnecessary and the fingerprint may be sensed rapidly. As a result, cost per unit bit is reduced, additional devices and power for accumulating charge are unnecessary, and power consumption is minimized.

According to the present invention, a fingerprint sensor having a simple structure is provided, which is able to precisely sense fingerprint information utilizing a piezoelectric phenomenon. Currents induced due to a piezoelectric phenomenon are measured based on pressures applied to the inside of the fingerprint sensor. Therefore, currents induced by changes in temperature and humidity have a negligible effect on the measurement, making additional security circuitry and materials unnecessary. Moreover, reliable results are rapidly obtained in-situ. Thus, the fingerprint sensor may be applied to systems for identifying persons' identities in public institutions and private enterprises, and in individuals' portable systems.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A fingerprint sensor having an aggregate of piezoelectric devices comprising:
   a substrate;
   a lower electrode formed on the substrate;
   a piezoelectric membrane formed on the lower electrode;
   an upper electrode formed on the piezoelectric membrane;
   a pressuring portion formed on the upper electrode for changing a quantity of charge on the piezoelectric membrane due to pressure exerted by contact of a fingerprint; and
   a non-conductive layer formed on the lower electrode for supporting and exposing the pressuring portion.

2. The fingerprint sensor of claim 1, wherein the aggregate of piezoelectric devices further comprises a capacitor, formed on the lower electrode, for storing changes in the quantity of charge occurring on the piezoelectric membrane.

3. The fingerprint sensor of claim 1, wherein the aggregate of piezoelectric devices has a structure in which piezoelectric devices are arrayed at regular intervals.

4. The fingerprint sensor of claim 1, wherein a cavity is formed in the substrate, and the piezoelectric membrane, the upper electrode, and the pressuring portion are formed on the lower electrode opposite the cavity.

5. The fingerprint sensor of claim 4, wherein the cavity has an upper cavity width at a topmost portion of the cavity and the pressuring portion has a lower pressuring portion width at a bottommost portion of the pressuring portion, and wherein the upper cavity width is greater than lower pressuring portion width.

6. The fingerprint sensor of claim 4, wherein the cavity formed in the substrate is proximate to the piezoelectric membrane, such that finger pressure applied to the pressuring portion can deform the piezoelectric membrane in a direction parallel to the finger pressure.

7. The fingerprint sensor of claim 1, further comprising an electrical circuit for outputting changes in the quantity of charge occurring on the piezoelectric membrane.

8. A fingerprint sensor having an aggregate of piezoelectric devices comprising:
   a substrate;
   a lower electrode formed on the substrate;
   a piezoelectric membrane formed on the lower electrode;
   an upper electrode formed on the piezoelectric membrane;
   a pressuring portion formed on the upper electrode for changing a quantity of charge on the piezoelectric membrane due to pressure exerted by contact of a fingerprint; and
   a non-conductive layer formed on the lower electrode for supporting and exposing the pressuring portion,
   wherein the pressuring portion protrudes from the surface of the non-conductive layer and the width of the pressuring portion is smaller than each protrusion of the fingerprint and a distance between the protrusions.

9. The fingerprint sensor of claim 8, wherein the width of the pressuring portion is 50μm or less.

10. A fingerprint sensor having an aggregate of piezoelectric devices comprising:
   a substrate;
   a lower electrode formed on the substrate;
   a piezoelectric membrane formed on the lower electrode;
   an upper electrode formed on the piezoelectric membrane;
   a pressuring portion formed on the upper electrode for changing a quantity of charge on the piezoelectric membrane due to pressure exerted by contact of a fingerprint; and a non-conductive layer formed on the lower electrode for supporting and exposing the pressuring portion, further comprising a supporting layer formed between the substrate and the lower electrode.

11. The fingerprint sensor of claim 10, wherein the supporting layer comprises $Si_3N_4$ or $SiO_2$.

12. The fingerprint sensor of claim 10, further comprising a cavity defined by the substrate, wherein at least a portion of the cavity is located directly below the supporting layer and proximate to the piezoelectric membrane.

13. The fingerprint sensor of claim 12, wherein the supporting layer is a deformable layer, such that finger pressure applied to an upper surface of the pressuring portion can cause the supporting layer to deform towards the cavity.

14. A fingerprint sensor having an aggregate of piezoelectric devices comprising:

a substrate;

a lower electrode formed on the substrate;

a piezoelectric membrane formed on the lower electrode;

an upper electrode formed on the piezoelectric membrane;

a pressuring portion formed on the upper electrode for changing a quantity of charge on the piezoelectric membrane due to pressure exerted by contact of a fingerprint; and a non-conductive layer formed on the lower electrode for supporting and exposing the pressuring portion, wherein the piezoelectric membrane comprises a material selected from the group consisting of PST, Quartz, $BaTiO_3$, PZT, (Pb, Sm)$TiO_3$, PMN(Pb(MgNb)O3)—PT(Pb$TiO_3$), PVDF-TrFE, and PVDF.

* * * * *